(12) United States Patent
Wang et al.

(10) Patent No.: US 7,773,973 B2
(45) Date of Patent: Aug. 10, 2010

(54) METHOD FOR AUTHENTICATION BETWEEN A MOBILE STATION AND A NETWORK

(75) Inventors: Zhengwei Wang, Guangdong (CN); Jie Kong, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 758 days.

(21) Appl. No.: 11/626,989

(22) Filed: Jan. 25, 2007

(65) Prior Publication Data

US 2007/0178886 A1   Aug. 2, 2007

Related U.S. Application Data

(63) Continuation of application No. PCT/CN2006/001193, filed on Jun. 2, 2006.

(30) Foreign Application Priority Data

Jun. 4, 2005   (CN) .......... 2005 1 0035162
Jul. 7, 2005   (CN) .......... 2005 1 0085888

(51) Int. Cl.
  H04M 1/66  (2006.01)
  H04M 1/68  (2006.01)
  H04M 3/16  (2006.01)
(52) U.S. Cl. ................ 455/411; 726/1
(58) Field of Classification Search .......... 455/441, 455/411; 726/1
  See application file for complete search history.

(56) References Cited

U.S. PATENT DOCUMENTS

2007/0178886 A1 * 8/2007 Wang et al. ............ 455/411

2008/0313698 A1 * 12/2008 Zhao et al. ............ 726/1

FOREIGN PATENT DOCUMENTS

| CN | 1430400 | 7/2003 |
|---|---|---|
| EP | 1326470 A | 7/2003 |
| EP | 1414259 A1 | 4/2004 |

(Continued)

OTHER PUBLICATIONS

"Universal Mobile Telecommunications System (UMTS); 3G security; Security architecture (3GPP TS 33.102 version 6.3.0 Release 6); ETSI TS 133 102"; ETSI Standards, European Telecommunications Standards Institute; Sophia-Antipo, FR; vol. 3-SA3, No. V630; Dec. 2004; XP014028207; ISSN: 0000-0001.

(Continued)

Primary Examiner—William D Cumming

(57) ABSTRACT

An authentication method and a method for transmitting authentication information, and the method for transmitting authentication information includes: an MS and a network agree in advance one or more agreed operations to be performed when the network determines that the SQNMS is an agreed value; the MS generating an authentication resynchronization token (AUTS) by using the agreed value, sending a resynchronization request containing the AUTS to the network; upon receiving the resynchronization request and determining that the SQNMS of the AUTS is the agreed value, the network performing the one or more agreed operations. The method of transmitting authentication information from the MS to the network conveniently implement the information transmitting between the MS and the network and guarantee the network security without increasing and changing the existing signaling resources and authentication parameters.

32 Claims, 8 Drawing Sheets

FOREIGN PATENT DOCUMENTS

| | | |
|---|---|---|
| EP | 1414260 A1 | 4/2004 |
| WO | 01/78306 A | 10/2001 |
| WO | 02/052874 A2 | 7/2002 |

OTHER PUBLICATIONS

Supplementary European Search Report for European Application No. 06742080.2, dated Jan. 18, 2008.

Zhang Fang-zhou, Ye Run-guo, Feng Yan-Jun, Song Cheng; A study of Authentication and Authorization in 3G Access, Weidianzixue Yu Jisuanji; vol. 21, No. 9; 2004.

Xiao Ning; Study of access security mechanism of WCDMA, Chongqing Youdian Xueyuanxuebao (Ziran Kexue Ban); vol. 16, No. 3; Jun. 2004.

* cited by examiner

METHOD FOR AUTHENTICATION BETWEEN A MOBILE STATION AND A NETWORK

CROSS-REFERENCE TO RELATED APPLICATIONS

This application is a continuation of International Application No. PCT/CN2006/001193 filed on Jun. 2, 2006. This application claims the benefit of Chinese Patent Application Nos. 200510035162.X filed on Jun. 4, 2005 and 200510085888.4 filed on Jul. 7, 2005. The disclosures of the above applications are incorporated herein by reference.

FIELD

The present disclosure relates to the communication security technique, and in particular, to an authentication method and a related method for transmitting information.

BACKGROUND

The statements in this section merely provide background information related to the present disclosure and may not constitute prior art.

Usually, one of the communication sides, for example a first unit, sends the information to the other side, for example a second unit, only after the second unit establishes an authentic connection with the first unit, i.e. the connection is established after the second unit authenticates the first unit successfully. With the connection, when the first unit sends corresponding information to the second unit, the second unit can determine the validity of the information transmitted. Sometimes, however, before a valid communicating connection is established between two communication sides, when one side needs to send important information to the other side, no valid method can be used. For example, the keys used for performing the authentication to each other between two communication sides are out of synchronism because of some reasons, i.e. they are not consistent any more, so that the normal mutual authentication can not be performed successfully and the valid mutual authentic connection can not be established. In this situation, one communication side, for example a first unit, needs to tell the other side, for example a second unit, that the authentication key needs to be synchronized again. How does the communication first unit send to the second unit the information that the authentication keys need to be synchronized again. When receiving the information from the first unit, it is a problem for the second unit to decide whether to believe or not it is secure information rather than information of an aggressive behavior triggered by an attacker.

Further, in the future communication networks, along with the enrichment of services and the extension of network functions, the security requirement of communication between a terminal and a network or between two communication units is correspondingly increased, and the geometric series increment of the quantity of information transmitted needs more secure and convenient information transmission mode.

The existing authentication method and information transmission method are simply described hereinafter by taking the existing 3G authentication as an example, the existing authentication in 3G network is completed by the collaborative work between a Mobile Station (MS), a Mobile Switching Center/Visitor Location Register (MSC/VLR) or a Serving GPRS Support Node (SGSN) and a Home Location Register/Authentication Center (HLR/AUC), an authentication key KI is stored in a Subscriber Identity Module/Universal Subscriber Identity Module (SIM/USIM) card, and an authentication key KI which is consistent with that stored in the SIM/USIM card is stored in the HLR/AUC. The MS and the AUC respectively calculate corresponding authentication parameters according to each KI stored in them, and the MSC/VLR compares the calculated results of two sides, and the validity determination of the MS by the network is completed. A procedure of authenticating the network by the MS is included in the process. If the authentication of the network by the MS fails, the MS will return an authentication failure message to the network.

The above message sent from the MS to the network is not authorized by the network, which may not lead to a severe security problem when used for returning the authentication failure message. Under some circumstances, however, when the MS sends information to the network, a severe security problem may occur if the network can not authenticate the MS.

For example, the MS sending to the network the information not authorized by the network that relates to the key configuration and update under some circumstances may cause a severe security problem. In the prior art, the message can be sent to the network side by an Unstructured Supplementary Service Data (USSD) mode or a short message mode, which can solve the security problem of information transmission because it will trigger an authentication procedure, however, the consumption of the signaling resources is largish.

To sum up, how to transmit information conveniently while guaranteeing the communication security without increasing the existing communication protocols, signaling resources and operation costs is a problem that is worthy to be solved.

SUMMARY

The embodiments of the present invention provide an authentication method and a method for transmitting authentication information, so as to make it possible to transmit information from the MS to the network side and guarantee the security of communication between the MS and the network without increasing the existing communication protocols, signaling resources and operation costs, as well as safely and conveniently perform the authentication and information transmission between communication units. In particular, it is possible for an MS to transmit valid information to the network before the connection between the MS and the network is established, such as in the authentication procedure.

A method for transmitting information, applied in 3G network or more advanced network for a mobile station (MS) to transmit information to a network, includes:

generating, by the MS, an authentication resynchronization token (AUTS) by using an agreed value substituting for a sequence number in MS (SQNMS);

sending, by the MS, a resynchronization request containing the AUTS to the network;

upon receiving the resynchronization request, performing, by the network, agreed operations corresponding to the agreed value if determining that the SQNMS of the AUTS is the agreed value.

An authentication method, applied in communication network for authentication between a mobile station (MS) and a network, includes:

generating, by the network a random number, generating an authentication vector according to the random number, an authentication key corresponding to the MS and a sequence number, and sending the authentication vector to the MS;

verifying, by the MS, the consistency of the authentication vector according to an authentication key stored in the MS, and determining according to a sequence number stored in MS whether the sequence number from the network is acceptable, if the consistency verification of the authentication vector succeeds and the sequence number from the network is acceptable, determining that the authentication of the network succeeds, generating a resynchronization token AUTS by using an agreed value substituting for the sequence number in MS, and sending to the network a resynchronization request containing the resynchronization token;

upon receiving the resynchronization request, performing, by the network, one or more agreed operations if determining that the sequence number of the resynchronization token is the agreed value.

An authentication method, applied for authentication between a first unit and a second unit which communicate with each other; and the first unit stores a first authentication key, a first synchronization key and a first sequence number;

the second unit stores a second authentication key, a second synchronization key and a second sequence number;

and the method includes:

generating, by the second unit, a random number, generating a message authentication code according to the random number, the second authentication key and the second sequence number; and sending the random number, the second sequence number and the message authentication code to the first unit;

verifying, by the first unit, the consistency of the message authentication code according to the first authentication key, the random number and the second sequence number, and determining according to the first sequence number whether the second sequence number is acceptable, if the consistency verification of the message authentication code succeeds and the second sequence number is acceptable, determining that the authentication of the second unit succeeds, generating a resynchronization authentication code by using an agreed value substituting for the first sequence number, and the first synchronization key, sending to the second unit a resynchronization request containing the resynchronization authentication code and the agreed value;

upon receiving the resynchronization request, performing, by the second unit, one or more agreed operations if determining that the first sequence number in the resynchronization authentication code is the agreed value.

The authentication method and the method of transmitting information from the MS to the network according to the embodiments of this invention conveniently implements authentication and information transmitting between an MS and a network and guarantees the communication security without increasing and changing the existing signaling resources and authentication parameters, and also safely and conveniently implements authentication and information transmitting between the communication units.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
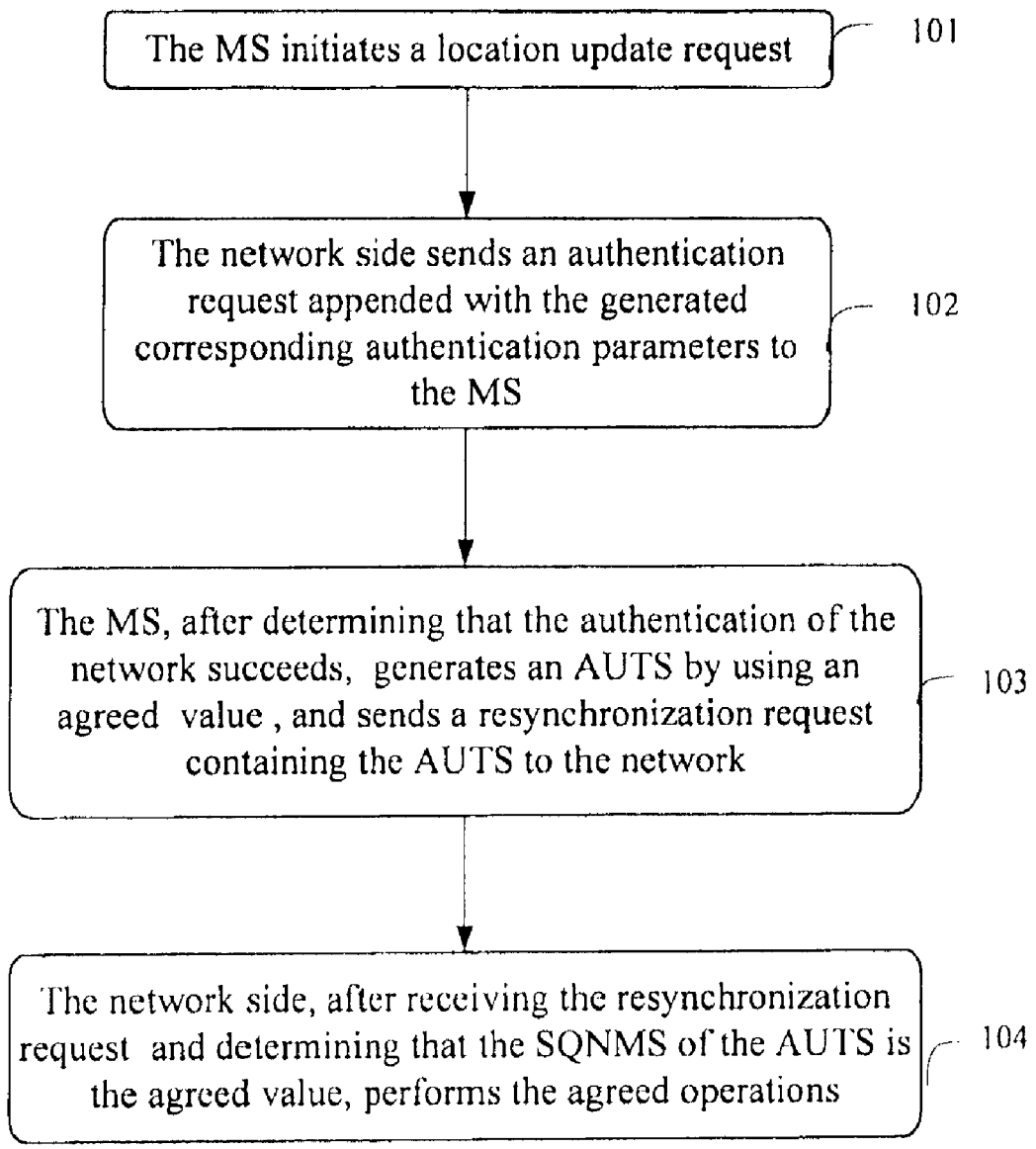
FIG. 1 is a flowchart of the method according to an example of one or more embodiments of this invention.

The following description is merely exemplary in nature and is not intended to limit the present disclosure, application, or uses. It should be understood that throughout the drawings, corresponding reference numerals indicate like or corresponding parts and features.

The authentication procedure of the existing 3G mobile communication system is briefly described first to have a better understanding of the present invention. An International Mobile Subscriber Identifier (IMSI), a Key Identifier (KI) and a Sequence number in MS (SQNMS) are stored in a mobile station (MS) 801, meanwhile, an IMSI, a KI and a Sequence number in Home Environment (SQNHE) corresponding to the MS 801 are stored in an HLR/AUC on the network side 802, which are used for mutual authentication between the MS 801 and the network 802.

The existing authentication procedure of 3 G communication system mainly includes: an HLR/AUC generating a random number (RAND), and then generating an expected user response (XRES), a Cipher Key (CK) and an Integrity key (IK) according to the RAND and a KI, generating a Message Authentication Code-A (MAC-A) according to the RAND, an SQNHE, the KI and an Authentication Management Field (AMF), obtaining an Authentication Token (AUTN) based on the MAC-A, the SQNHE, an Anonymity Key (AK) and the AMF. The RAND, XRES, CK, IK and AUTN form an authentication Quintet Vector, which is sent to an MSC/VLR and stored therein. In practice, one or more Quintet Vectors are generated and sent by an HLR/AUC to an MSC/VLR upon request of the MSC/VLR. During authentication, the MSC/VLR sends the RAND and the AUTN of the corresponding Quintet Vector to the MS 801, and the MS 801 verifies the consistency of the AUTN according to the KI stored in the MS 801 itself, if the consistency verification fails, returns an authentication failure message to the MSC/VLR; if the consistency verification succeeds, determines whether the SQNHE is within an acceptable range, if the SQNHE is within the acceptable range, the MS 801 determines that the authentication of the network 802 succeeds, and returns an authentication response generated by the MS 801 to the MSC/VLR and updates the SQNMS according to the SQNHE in the AUTN, the MSC/VLR determines the validity of the MS 801 by determining whether the authentication response returned by the MS 801 is consistent with the XRES of the corresponding Quintet Vector; if the SQNHE is not within the acceptable range, the MS 801 generating an authentication resynchronization token (AUTS) according to the SQNMS, and returns a resynchronization request or a synchronization failure message to the MSC/VLR on the network side 802, at the same time appends the generated AUTS in the request or in the message, i.e. the AUTS is included in the request or in the message. Upon receiving the AUTS, the MSC/VLR on the network side 802 sends the AUTS and the RAND of the corresponding Quintet Vector to the HLR/AUC. The HLR/AUC determines the validity of the AUTS according to the correspondingly stored KI and the received RAND. If the AUTS is not valid, the HLR/AUC returns an AUTS invalid message to the MSC/VLR; if the AUTS is valid, the HLR/AUC updates the SQNHE according to the SQNMS in the AUTS, generates a new authentication Quintet Vector and sends it to the MSC/VLR. Upon receiving the new Quintet Vector, the MSC/VLR deletes the corresponding old Quintet Vector. Refer to 3GPP standards for the authentication procedure.

It can be seen that, in the existing authentication procedure of 3G communication system, an SQNMS is mainly used for determining whether the SQNHE in an AUTN is up to date or whether the SQNHE is within an acceptable range, and for updating the SQNHE.

The embodiments of the present invention provide an improved authentication method and a method for transmitting authentication information. By the methods, when the MS 801 authenticates the network side 802 successfully, i.e. the MS 801 verifies the consistency of the AUTN successfully according to the KI stored in the MS 801 and the SQNHE in the AUTN is within an acceptable range, the MS 801 generates an AUTS and sends a resynchronization request, and transmits information to the network side 802 through the resynchronization request sent from the MS 801 to the network 802 and the SQNMS in the appended AUTS. After the MS 801 authenticates the network side 802 successfully, the AUTS is generated by the MS 801 using an agreed value substituting for the SQNMS, and the resynchronization request appended with the AUTS is sent to the network side 802. Upon receiving the resynchronization request, the network side 802 determines whether the SQNMS in the AUTS is the agreed value, if the SQNMS is the agreed value, performs one or more agreed operations; otherwise, performs the normal synchronization procedure, i.e. updates the SQNHE according to the SQNMS and performs the subsequent procedure. Before determining whether the SQNMS in the AUTS is the agreed value, the network side 802 may further authenticate the MS 801 and verify the integrality of the SQNMS to determine the validity of the AUTS. The methods according to the embodiments of this invention may not only transmit information to the network 802 conveniently by efficiently using the existing authentication parameters, but also improve the security and integrality of transmitting information from an MS 801 to a network 802 by using the authentication steps of processing a resynchronization request by the network side 802.

The authentication method and the method for transmitting authentication information provided by the embodiments of this invention may not only be used for authentication and information transmission between an MS and a network, but also may be used for authentication and information transmission between any two units which can communicate with each other, for example, the units of such wireless communication networks as the Wimax, or the units of the wire communication networks.

A detailed description of example and embodiments of the present invention is described hereinafter with reference to the attached drawings.

First, an example of the invention is hereinafter described to clarify the implementation and application of the method in the mobile communication, refer to FIG. 1, which is a flowchart according to the example of this invention.

Step 101, an MS initiates a location update request to the network side.

Optionally, the request also can be a service request in this step. In practice, the request can be any message sent by the MS that can trigger the network to authenticate the MS.

Step 102, upon receiving the location update request, the network side sends the corresponding authentication parameters of a generated authentication vector to the MS. In practice, the network side may only generate the corresponding authentication parameters.

The authentication vector includes a RAND, an XRES, a CK, an IK and an AUTN.

The corresponding authentication parameters include the RAND and AUTN.

During the process of generating an authentication vector, the HLR/AUC calculates the XRES, CK and IK, respectively, by using the RAND generated from a random number generator and the KI stored in the HLR/AUC, and obtains the AUTN based on the RAND, the KI, an SQNHE and an AMF.

The length of the AUTN is 16 bytes, including: 1) an SQNHE^ AK, i.e. an SQNHE encrypted by an AK, and the length of the SQNHE and AK each is 6 bytes, and the SQNHE is an SQN stored on the network side, which is used for distinguishing from an SQNMS stored in the MS; when the SQNHE needs to be encrypted, the HLR/AUC generates the AK according to the RAND and KI, and performs an Exclusive OR (XOR) operation to the SQNHE by using the AK to encrypt the SQNHE; when the SQNHE does not need to be encrypted, AK=0; 2) an AMF with length of 2 types; 3) an MAC-A with length of 8 bytes for verifying the data integrity of the RAND, SQNHE and AMF, and authenticating the HLR/AUC by the MS. the MAC-A of the AUTN is calculated by the HLR/AUC according to the RAND, SQNHE, KI and AMF.

In this way, an authentication Quintet Vector is formed by the RAND, XRES, CK, IK and AUTN. In this embodiment, only the RAND and AUTN are used during information transmission from an MS to the network.

After generating an authentication Quintet Vector, the HLR/AUC sends the corresponding IMSI and the authentication Quintet Vector including the RAND, CK, IK, XRES and AUTN to the MSC/VLR, which is a circuit switched domain device, and may be a Serving GPRS Support Node (SGSN) for a packet switched domain network. During authentication, the MSC/VLR on the network side sends the RAND and AUTN of the authentication vector received from the HLR/AUC to the MS.

Step 103, after receiving the corresponding authentication parameters, i.e. the RAND and AUTN, and determining that the authentication of the network side succeeds, the MS generates an AUTS by using an agreed value substituting for the SQNMS and initiates to the network side a resynchronization request appended with the AUTS. That is, a synchronization failure message containing the AUTS is transmitted to the network side.

The AUTS includes: 1) an SQNMS^ AK, i.e. an SQNMS encrypted by an AK, and the length of the SQNMS and AK each is 6 bytes, and the SQNMS is an SQN stored in the MS, which is used for distinguishing from an SQNHE stored on the network side; when the SQNMS needs to be encrypted, the MS generates an AK according to the RAND and KI, performs an XOR operation to the SQNMS by using the AK to encrypt the SQNMS; when the SQNMS does not need to be encrypted, AK=0; 2) an MAC-S with length of 8 bytes for verifying the data integrity of the RAND and SQNMS, and authenticating the MS by the HLR/AUC, i.e. verifying the validity of the AUTS by the HLR/AUC. Commonly, the MS calculates an MAC-S according to the SQNMS and KI stored in the MS itself and the received RAND and AMF, then obtains the AUTS according to the SQNMS, AK and MAC-S.

Specifically, the MS calculates the MAC-A according to the received RAND, the KI stored in the MS, the SQNHE and AMF in the received AUTN by using the same method of calculating the MAC-A of the AUTN by the HLR/AUC, then verifies the consistency, i.e., compares whether the MAC-A calculated by the MS is consistent with that in the received AUTN, for instance, determining whether the two MAC-As are the same; if they are not consistent, returns an authentication failure message to the MSC/VLR; if they are consistent, determines whether the SQNHE is within an acceptable range; if the SQNHE is within the acceptable range, the MS determines that the authentication of the network side succeeds; if the SQNHE is not within the acceptable range, the MS generates an AUTS according to the SQNMS, i.e. calculates an MAC-S according to the SQNMS, the KI and the received RAND and AMF, then generates the AUTS according to the SQNMS, AK and MAC-S, and returns a resynchronization request appended with the generated AUTS or a synchronization failure message containing the AUTS.

After the authentication of the network side succeeds, the MS calculates an MAC-S according to the agreed value substituting for the SQNMS, the KI stored in the MS, the received RAND and AMF, then generates the AUTS according to the agreed value, the AK and the MAC-S, sends to the network side a resynchronization request appended with the AUTS or a synchronization failure message containing the AUTS. Refer to 3G standards for the detailed generating procedure and the algorithm used therein.

Step 104, after receiving a resynchronization request and determining that the SQNMS in the AUTS is the agreed value, the network side performs the one or more agreed operations.

The MS and the network side agree in advance that, after receiving the resynchronization request from the MS, if the SQNMS is determined to be the agreed value, the network side performs the one or more agreed operations according to the agreed value. The agreed operations may include one or more of key updating, authentication algorithm updating, theft protection verification, canceling theft protection verification, acquiring corresponding information and returning the result information of performing a specific operation. The acquiring corresponding information may include learning whether the MS has some abilities according to the SQNMS value, for example, whether it supports the GPS positioning function, whether it supports mobile payment; the specific operation may be the corresponding processing according to the different values of AMF, also may be the initialization operation according to one kind of configuration, and still may be the special initialization operation to the MS according to the current location area or the operator while the MS is roaming, etc.

In step 104, the step of determining the validity of the AUTS may be included as well.

That is, before determining whether the SQNMS of the AUTS is the agreed value, the step of determining the validity of the AUTS may be included. Specifically, upon receiving the AUTS returned by the MS, the MSC/VLR of the network side sends the RAND of the corresponding Quintet Vector and the AUTS to the HLR/AUC, the HLR/AUC first calculates the MAC-S according to the RAND, KI, SQNMS and AMF by using the same algorithm as that used by the MS, then compares the calculated MAC-S with the MAC-S of the received AUTS, if they are consistent, determines that the AUTS is valid, otherwise, determines that the AUTS is not valid. If the AUTS is determined to be not valid, the HLR/AUC returns to the MSC/VLR a message indicating that the AUTS is not valid. If the AUTS is determined to be valid, the HLR/AUC further determines whether the SQNMS is the agreed value, if the SQNMS is the agreed value, performs one or more agreed operations. Otherwise, i.e. the SQNMS is not the agreed value, the HLR/AUC performs normal synchronization procedure, i.e. updates the SQNHE according to the SQNMS and performs the subsequent processing. Refer to 3G standards for the normal synchronization procedure.

Optionally, the step of determining the validity of the AUTS may be further included after the SQNMS of the AUTS is determined to be the agreed value and before the one or more agreed operations is performed.

Specifically, upon receiving the AUTS returned by the MS, the MSC/VLR of the network side sends the RAND of the corresponding Quintet Vector and the AUTS to the HLR/AUC, after determining that the SQNMS is the agreed value, the HLR/AUC calculates the MAC-S according to the RAND, KI, SQNMS and AMF by using the same algorithm as that used by the MS, then compares the calculated MAC-S with the MAC-S of the received AUTS, if they are consistent, determines that the AUTS is valid, otherwise determines that the AUTS is not valid. If the AUTS is determined to be not valid, the HLR/AUC returns to the MSC/VLR a message indicating that the AUTS is not valid. If the AUTS is determined to be valid, the HLR/AUC performs the one or more agreed operations. If the SQNMS is determined to be not the agreed value, the HLR/AUC performs normal synchronization procedure, i.e. if the AUTS is determined to be valid, updates the SQNHE according to the SQNMS, and performs the subsequent processing; and if the AUTS is determined to be not valid, the HLR/AUC returns to the MSC/VLR a message indicating that the AUTS is not valid. Refer to 3G standards for the normal synchronization procedure.

Optionally, in step 103, the MAC-S may also be generated by calculation according to the RAND, KI and SQNMS rather than according to the AMF, then in step 104, the network side may also determine the validity of the MAC-S according to the RAND, KI and SQNMS rather than according to the AMF.

Figure 2:
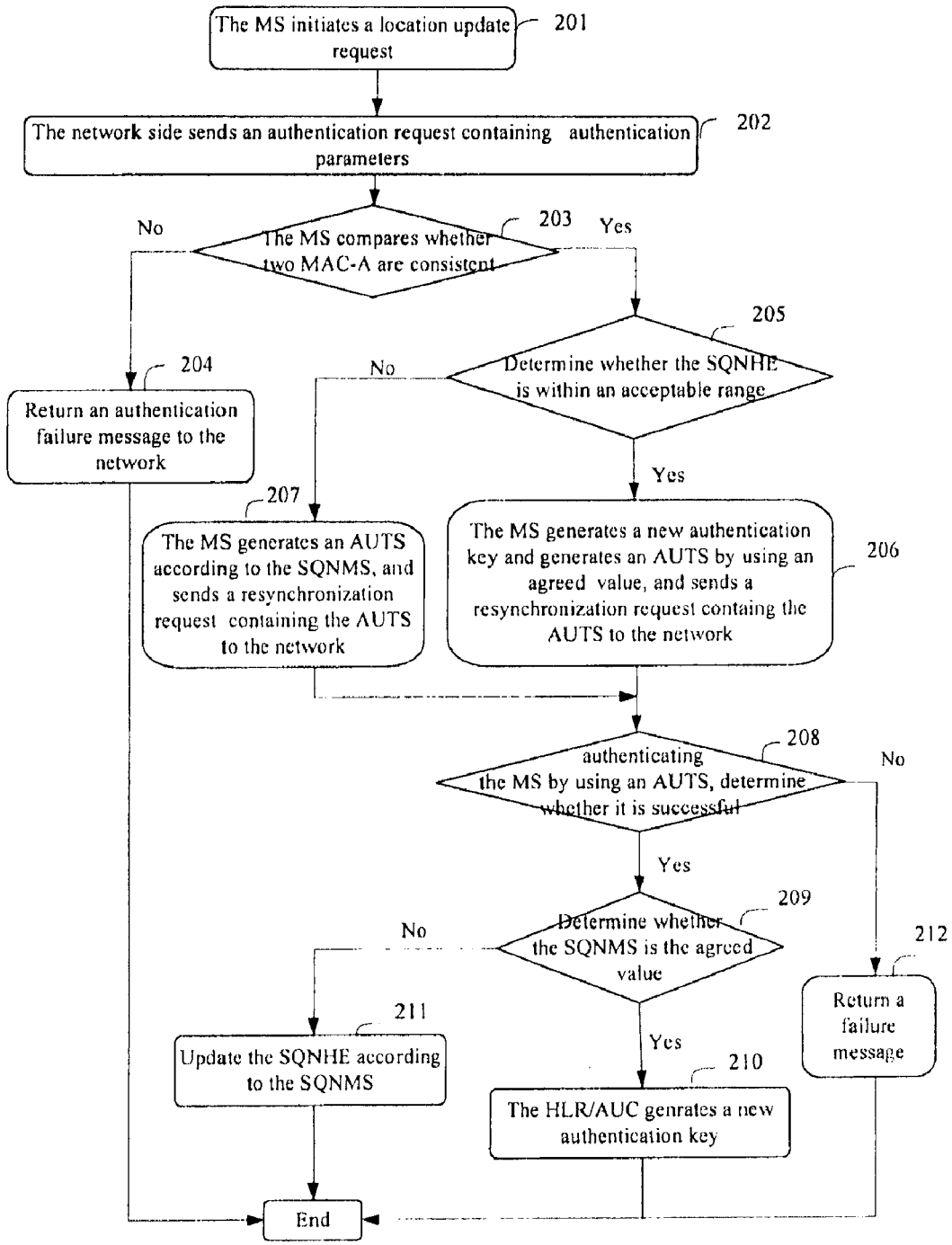
FIG. 2 is a flowchart according to the first embodiment of this invention.

Refer to FIG. 2, which is a flowchart according to a first embodiment of this invention, the process for an MS notifying the network side to update the key is described in this embodiment for a better understanding of this invention.

Step 201, an MS initiates a location update request to the network side.

The request may also be a service request in this step. And in practice, the request may be any message sent by the MS that can trigger the network to authenticate the MS.

Step 202, upon receiving the request, the network side sends to the MS the corresponding authentication parameters of the generated authentication vector of the corresponding MS by sending an authentication request to the MS.

Specifically, an HLR/AUC generates a RAND using a random number generator, calculates an XRES, a CK and an IK, respectively, according to the RAND and KI, calculates an MAC-A according to the RAND, SQNHE, KI and AMF, and obtains an AUTN based on the MAC-A, SQNHE, AK and AMF. When the SQNHE needs to be encrypted, the HLR/AUC generates the AK according to the RAND and KI, and an XOR operation to the SQNHE is performed by the AK to encrypt the SQNHE; when the SQNHE does not need to be encrypted, AK=0.

Afterward, the HLR/AUC sends to an MSC/VLR the Quintet Vector composed of the RAND, AUTN, XRES, CK and IK and the corresponding IMSI. During authentication, the MSC/VLR initiates an authentication request to the MS, and at the same time sends the corresponding authentication parameters of the RAND and AUTN to the MS.

In practice, the embodiment of the present invention may be implemented without generating an XRES, IK and CK, which can be regarded as the modification of this embodiment.

Step 203, upon receiving the authentication request, the MS first authenticates the network, and determines whether the authentication succeeds.

Specifically, upon receiving the RAND and AUTN from the network side, the MS generates the MAC-A according to the received RAND, the KI stored in the MS and the SQNHE and AMF of the received AUTN by using the same algorithm as that used by the HLR/AUC for calculating the MAC-A of the AUTN, then the MS compares the MAC-A generated by the MS itself with the MAC-A generated by the network side, if they are not consistent, the authentication of the network fails, the process proceeds to step 204, otherwise the process proceeds to step 205.

Step 204, the MS returns an authentication failure message to the network, and then the process terminates.

Step 205, the MS determines whether the SQNHE is within an acceptable range, if the SQNHE is within the acceptable range, determines that the authentication of the network succeeds, and the process proceeds to step 206, otherwise, determines that the synchronization fails, and the process proceeds to step 207.

Step 206, the MS generates an AUTS by using an agreed value substituting for the SQNMS, and initiates to the network a resynchronization request appended with the AUTS. Specifically, the MS calculates an MAC-S according to the agreed value substituting for the SQNMS, the KI stored in the MS, the received RAND and AMF, then generates the AUTS according to the agreed value, an AK, the MAC-S, and sends a resynchronization request appended with the AUTS to the network. That is, a synchronization failure message containing the AUTS is sent to the MSC/VLR. The one or more agreed operations corresponding to the agreed value, i.e. the operations performed by the network side when identifying the agreed value, is "generating a new KI"; Step 206 further includes generating, by the MS, a new KI according to the RAND and KI. Then the process proceeds to step 208.

In step 206, the MS can further update the stored SQNMS according to the SQNHE.

Step 207, the MS generates an AUTS directly according to the SQNMS, and initiates a resynchronization request appended with the AUTS to the network. Specifically, the MS calculates an MAC-S according to the KI, SQNMS, the received RAND and AMF, and then generates the AUTS according to the SQNMS, AK and MAC-S, then initiates the resynchronization request appended with the AUTS to the network side. That is, a synchronization failure message containing the AUTS is sent to the MSC/VLR. Then the process proceeds to step 208.

Step 208, upon receiving the resynchronization request, the network side calculates an MAC-S according to the RAND of the corresponding Quintet Vector, the stored KI, the SQNMS and AMF of the received AUTS by using the same algorithm as that used by the MS, then authenticating the MS by determining whether the MAC-S generated by the MS is consistent with the MAC-S of the received AUTS, if the two MAC-Ss are consistent, determines that the authentication succeeds, i.e. the AUTS is valid, then the process proceeds to step 209; otherwise, if the two MAC-Ss are not consistent, determines that the AUTS is not valid, the process proceeds to step 212.

Specifically, upon receiving the AUTS returned by the MS, the MSC/VLR of the network side sends the AUTS and RAND of the corresponding Quintet Vector to the HLR/AUC, the HLR/AUC first calculates the MAC-S according to the received RAND, the SQNMS of the AUTS, the KI and AMF stored in HLR/AUC itself by using the same algorithm as that used by the MS, then compares the calculated MAC-S with the MAC-S of the received AUTS, if the two MAC-Ss are consistent, determines that the AUTS is valid, otherwise, determines that the AUTS is not valid. It should be noted that, if the SQNMS of the AUTS is encrypted by the AK, the HLR/AUC can generate an AK according to the RAND and KI to decrypt the SQNMS cipher text to obtain the SQNMS plain text. Because it is the operations of 3GPP protocol standards, no more description will be given here.

Step 209, the HLR/AUC of the network side determines whether the SQNMS of the AUTS is the agreed value. If the SQNMS is the agreed value, the process proceeds to step 210; otherwise, the process proceeds to step 211.

Step 210, the network side performs one or more agreed operations corresponding to the agreed value, i.e. performs the KI update, that is, the HLR/AUC generates a new KI according to the RAND and KI by using the same algorithm as that used by the MS, then the information transmission process terminates.

Step 211, the HLR/AUC updates the SQNHE according to the SQNMS value, and then the information transmission process terminates.

Step 212, the network side returns a failure message; then the information transmission process terminates.

In practice, this embodiment of the present invention may be implemented without an AMF when generating an MAC-S in step 206 and 207, that is, the MAC-S also can be calculated only according to the RAND, KI and the SQNMS; Please refer to 3GPP standards for detailed algorithm. Certainly, if the MS performs such operation, in step 208, correspondingly, the network side also generates the MAC-S to authenticate the MS by using the same parameters and algorithm as those used by the MS, which should be regarded as the modification of this embodiment and should be all covered in the protection scope of the present invention.

In step 208 and 209 as well as the subsequent steps of this embodiment, upon receiving the resynchronization request, the HLR/AUC of the network side may first determine whether the SQNMS of the AUTS is the agreed value, if the SQNMS of the AUTS is not the agreed value, perform the normal synchronization procedure rather than directly perform step 211, otherwise, i.e. if the SQNMS of the AUTS is the agreed value, further determine the validity of the AUTS, if the AUTS is valid, the process proceeds to step 210, if the AUTS is not valid, the process proceeds to step 212.

Figure 3:
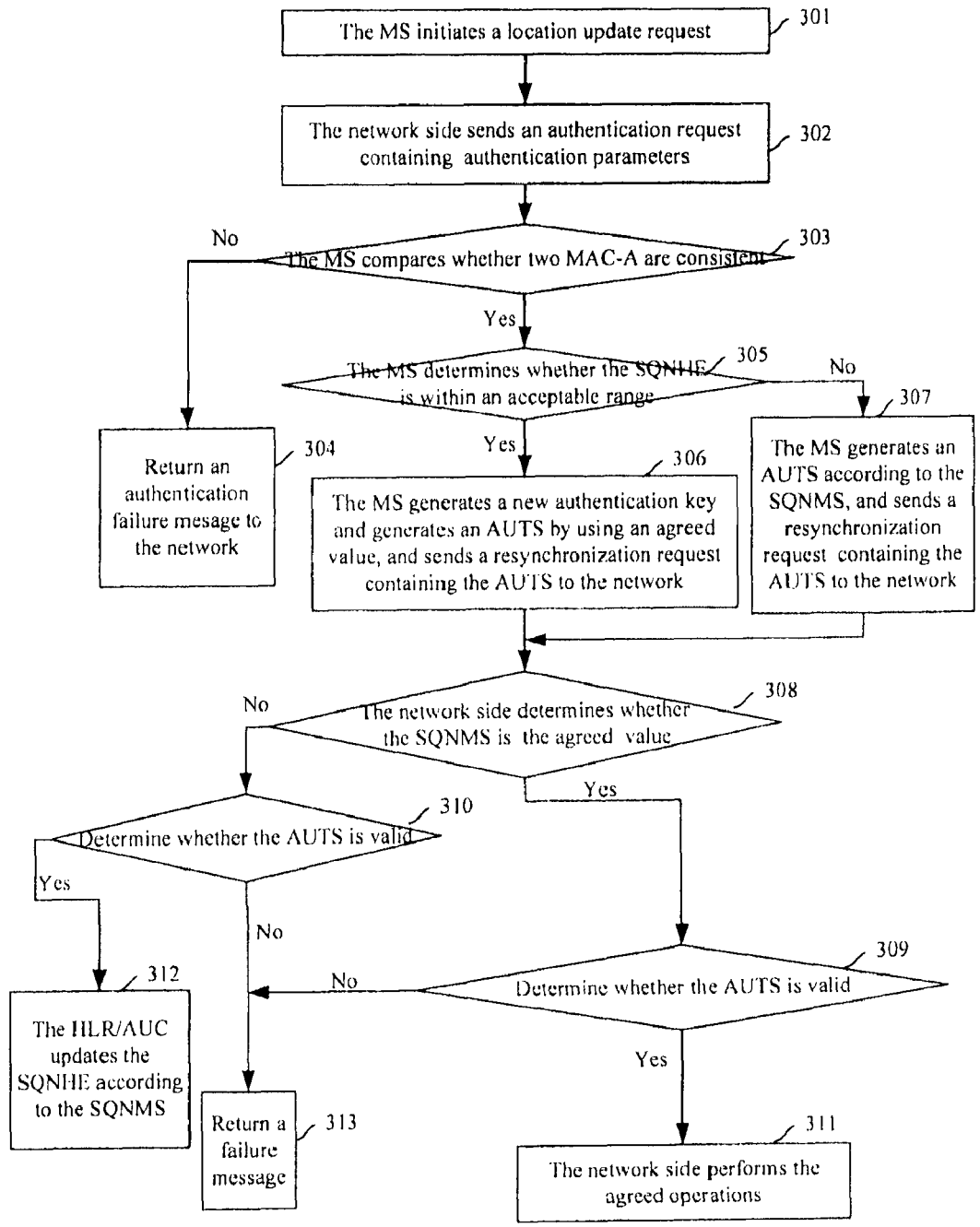
FIG. 3 is a flowchart according to the second embodiment of this invention.

Referring to FIG. 3, which is a flowchart according to a second embodiment of this invention, compared with the first embodiment, upon receiving a resynchronization request, the HLR/AUC of the network side can first determine whether the SQNMS of the AUTS is the agreed value, and then determine the validity of the AUTS in this embodiment, which is different with the processes in the first embodiment, and the method of this embodiment including the following steps.

Step 301, an MS initiates a location update request to the network side.

Step 302, upon receiving the request, the network side sends to the MS the corresponding authentication parameters of the generated authentication vector of the corresponding MS by sending an authentication request to the MS.

Specifically, an HLR/AUC generates a RAND using a random number generator, calculates an XRES, IK and CK, respectively, according to the RAND and a KI, and calculates an MAC-A according to the RAND, an SQNHE, a KI and an AMF, then obtains an AUTN based on the MAC-A, the SQNHE, an AK and the AMF. Herein, when the SQNHE needs to be encrypted, the HLR/AUC generates the AK according to the RAND and KI, performs an XOR operation to the SQNHE by using the AK to encrypt the SQNHE; when the SQNHE does not need to be encrypted, AK=0.

Then the HLR/AUC sends the Quintet Vector composed of the RAND, AUTN, XRES, CK and IK and the corresponding IMSI to an MSC/VLR. During authentication, the MSC/VLR initiates an authentication request to the MS, and at the same time sends to the MS the corresponding authentication parameters RAND and AUTN.

In practice, this embodiment may be implemented without generating the XRES, CK and IK, which can be regarded as the modification of this embodiment.

Step 303, upon receiving the authentication request, the MS first authenticates the network, and determines whether the authentication succeeds.

Specifically, upon receiving the RAND and AUTN from the network side, the MS generates an MAC-A according to the received RAND, the KI stored in the MS, the SQNHE and AMF of the received AUTN by using the same algorithm as that used by the HLR/AUC for calculating the MAC-A of the AUTN, then the MS compares the MAC-A generated by the MS itself with the MAC-A generated by the network side, if the two MAC-As are not consistent, determines that the authentication of the network fails, the process proceeds to step 304, otherwise, the process proceeds to step 305.

Step 304, the MS returns an authentication failure message to the network, and then the process terminates.

Step 305, the MS determines whether the SQNHE is within an acceptable range, if the SQNHE is within the acceptable range, determines that the authentication of the network succeeds, and the process proceeds to step 306, otherwise, determines that the synchronization fails, and the process proceeds to step 307.

Step 306, the MS generates an AUTS by using an agreed value substituting for the SQNMS, and initiates to the network a resynchronization request appended with the AUTS. Specifically, the MS calculates an MAC-S according to the agreed value substituting for the SQNMS, the KI stored in the MS and the received RAND and AMF, then generates the AUTS according to the agreed value, an AK and the MAC-S, and sends a resynchronization request appended with the AUTS to the network. That is, a synchronization failure message containing the AUTS is sent to the MSC/VLR. The one or more agreed operations corresponding to the agreed value, i.e. the operations performed by the network side while identifying the agreed value is "generating a new KI"; Step 306 may further include generating, by the MS, a new KI according to the RAND and KI. Then the process proceeds to step 308.

In step 306, the MS may further update the stored SQNMS according to the SQNHE.

Step 307, the MS generates the AUTS directly according to the SQNMS, and initiates to the network the resynchronization request appended with the AUTS. Specifically, the MS calculates an MAC-S according to the KI and SQNMS of the MS, the received RAND and AMF, generates the AUTS according to the SQNMS, AK and MAC-S, then initiates to the network side the resynchronization request appended with the AUTS. That is, a synchronization failure message containing the AUTS is sent to the MSC/VLR. Then the process proceeds to step 308.

Step 308, upon receiving the resynchronization request, the HLR/AUC of the network side determines whether the SQNMS of the AUTS is the agreed value. If the SQNMS of the AUTS is the agreed value, the process proceeds to step 309; otherwise, the process proceeds to step 310.

It should be noted that, if the SQNMS of the AUTS is encrypted by the AK, the HLR/AUC can generate the AK according to the RAND and KI to decrypt the SQNMS cipher text to obtain the SQNMS plain text. Because it is the operations of 3GPP protocol standards, no more description will be given here.

Step 309, the network side calculates an MAC-S according to the RAND of the corresponding Quintet Vector, the stored KI as well as the SQNMS and AMF of the received AUTS by using the same algorithm as that used by the MS, then authenticates the MS by determining whether the MAC-S calculated by the network side itself is consistent with the MAC-S of the received AUTS, if they are consistent, determines that the authentication succeeds, i.e. the AUTS is valid, then the process proceeds to step 311; otherwise the AUTS is not valid, the process proceeds to step 313.

Specifically, upon receiving the AUTS returned by the MS, the MSC/VLR on the network side sends the RAND of the corresponding Quintet Vector and the AUTS to the HLR/AUC, the HLR/AUC first calculates the MAC-S according to the received RAND, the SQNMS of the AUTS, the stored KI and AMF by using the same algorithm as that used by the MS, then compares the calculated MAC-S with the MAC-S of the received AUTS, if they are consistent, determines that the AUTS is valid, otherwise, determines that the AUTS is not valid.

Step 311, the network side performs the one or more agreed operations corresponding to the agreed value, i.e. performs the KI update, that is, the HLR/AUC generates a new KI according to the RAND and KI by using the same algorithm as that used by the MS, then the information transmission process terminates.

Step 310, the network side calculates an MAC-S according to the RAND of the corresponding Quintet Vector, the stored KI as well as the SQNMS and AMF of the received AUTS by using the same algorithm as that used by the MS, then authenticates the MS by determining whether the MAC-S generated by the network side itself is consistent with the MAC-S of the received AUTS, if they are consistent, determines that the authentication succeeds, i.e. the AUTS is valid, then the process proceeds to step 312; otherwise, determines that the AUTS is not valid, the process proceeds to step 313.

Specifically, upon receiving the AUTS returned by the MS, the MSC/VLR of the network side sends the RAND of the corresponding Quintet Vector and the AUTS to the HLR/AUC, and the HLR/AUC first calculates the MAC-S according to the received RAND, the SQNMS of the AUTS, the stored KI and AMF by using the same algorithm as that used by the MS, then compares the calculated MAC-S with the MAC-S of the received AUTS, if they are consistent, determines that the AUTS is valid, otherwise, determines that the AUTS is not valid.

Step 312, the HLR/AUC updates the SQNHE according to the SQNMS value, and then the information transmission process terminates.

Step 313, the network side returns a failure message; then the information transmission process terminates.

In practice, the embodiment of this method may be implemented without the AMF while generating the MAC-S in step 306 and 307, that is, the MAC-S can also be calculated only according to the RAND, KI and SQNMS. Please refer to 3GPP standards for detailed algorithm. Certainly, if the MS performs such operation, in step 309 or 310, the network side also calculates the MAC-S to authenticate the MS by using the same parameters and algorithm as those used by the MS, which should be regarded as the modification of this embodiment and should be all covered in the protection scope of the present invention.

In the foregoing embodiments, the determining of whether the SQNMS is the agreed value and the determining of the validity of the AUTS are described, the order of the two determining steps can be exchanged. Generally, the exchange of the order does not influence the implementation effects. It should be noted that, however, when determining whether the SQNMS is the agreed value first and determining the validity of the AUTS later, the HLR/AUC, after determining that the SQNMS is the agreed value, can further determine the mode used by the determining of the validity of the AUTS, for example, determine which algorithm or parameters can be used for performing the determination of the validity of the resynchronization message. Therefore, the order of determining whether the SQNMS is the agreed value first and determining the validity of the AUTS later can make this method more expansible.

The method provided by the embodiments of the present invention can be used for transmitting the key update request information to the network side, for transmitting the request information of updating the authentication algorithm to the HLR/AUC, for transmitting the information about whether performing, by the MS, the theft protection verification or canceling the theft protection verification to the network side, and for transmitting the information about whether the MS supporting the exchange of the SQN verification parameters or the configuration of the threshold for limiting the valid time of an IK and a CK to the HLR/AUC, etc.

In the case of initiating the key update by the HLR/AUC, the MS may return to the HLR/AUC a message indicating whether the key update succeeds by using the method of an embodiment.

In practice, some values of the SQNMS can be set as the agreed value, for example, values of the SQNMS less than 256 can be set as the agreed values, obviously, the initial value used for determining whether the AUTN is within an acceptable range by the SQNMS should be equal to or larger than 256, a specific value, such as 1024, can also be set, as the agreed value. Values within a certain range and some specific values of SQNMS can be set at the same time as the agreed values as well, for example, the values of the SQNMS less than 256 and two specific values, 1024 and 2048, can be set as the agreed values at the same time. For example, SQNMS=128 is agreed to represent the information of requesting to update the KI transmitted from the MS to the HLR/AUC, and SQNMS=12 is agreed to represent the information of setting the theft protection verification by the MS transmitted from the MS to the HLR/AUC, and SQNMS=13 is agreed to represent the information of canceling the theft protection verification by the MS transmitted from the MS to the HLR/AUC, and SQNMS=1023 is agreed to represent the information of the key update success transmitted from the MS to the HLR/AUC, and SQNMS=1024 is agreed to represent the information of the key update failure transmitted from the MS to the HLR/AUC.

The above MSC/VLR is a circuit switched domain device, and a corresponding device for the packet switched domain network may be an SGSN, so this embodiment can be equivalently applied in the packet switched domains.

In the foregoing embodiments, the MS and the HLR/AUC can generate a new KI using a mature digest algorithm referring to a book of "Applied Cryptology" or the corresponding algorithm papers or reports; certainly, the algorithm of generating a CK or an IK by a RAND and a KI mentioned in 3GPP protocols can also be used for generating the new KI.

Please refer to the corresponding 3GPP protocols for such operations in the forgoing embodiments as the consistency verification of the AUTN and the determination about whether the SQNHE is within an acceptable range by the MS, the validity determination of the AUTS and the updating of the SQNHE by the HLR/AUC when the HLR/AUC generates an authentication vector; and the algorithms of generating the authentication vector and generating the AUTS. No further description will be given here because they are well-known technique.

The implementation and the application between two communication units according to the methods of the present invention are described in the following embodiments. The units include a first unit 901 and a second unit 902, a first authentication key AK1 and a first synchronization key SK1 are stored in the first unit 901, a second authentication key AK2 and a second synchronization key SK2 is stored in the second unit 902 correspondingly; a first sequence number SQN1 is stored in the first unit 901, while a second sequence number SQN2 is stored in the second unit 902.

During authentication, the second unit 902 sends generated authentication parameter information to the first unit 901, the authentication parameter information includes a RAND, an SQN2 and an MAC-A; in practice, when generating the authentication parameter information, the second unit 902 generates a RAND first, for example, the second unit 902 sets a random number generator, from which the RAND is generated, then calculates the MAC-A according to the RAND, the SQN2 and an AK2; the first unit 901 verifies the consistency of the authentication parameter information received from the second unit 902, that is, verifies the consistency of the MAC-A, and a result is calculated according to the AK1 and the RAND and SQN2 received from the second unit 902 by using the same method as that used by the second unit 902 for calculating an MAC-A, the first unit 901 compares the result calculated by itself with the MAC-A received from the second unit 902 and determines whether they are consistent, if they are not consistent, the consistency verification of the MAC-A fails, then determines that the authentication of the second unit 902 fails. If the consistency verification of the MAC-A succeeds, the first unit 901 verifies according to the SQN1 stored in the first unit 901 itself whether the SQN2 is acceptable, if it is acceptable, determines that the authentication of the second unit 902 succeeds, and updates the SQN1 according to the SQN2; if the SQN2 is not acceptable, calculates an MAC-S according to the RAND, SQN1 and an SK1, and sends a resynchronization message containing the SQN1 and MAC-S to the second unit 902. The second unit 902 determines the validity of the resynchronization message of the first unit 901, i.e. the validity of the MAC-S, herein a result is calculated by the second unit 902 according to the SK2 and RAND stored in the second unit 902 itself and the SQN1 received from the first unit 901 by using the same method as that used by the first unit 901 for calculating the MAC-S, and the second unit 902 compares the result calculated by itself with the MAC-S received from the first unit 901 and determines whether they are consistent, if they are consistent, determines that the resynchronization message of the first unit 901 is valid, and updates the SQN2 according to the SQN1; if the calculated result and the MAC-S are not consistent, determines that the resynchronization message of the first unit 901 is not valid. Herein, while the second unit 902 verifies the consistency of the MAC-S, a RAND is needed, and the RAND may be stored correspondingly by the second unit 902 after the authentication parameters are generated. The RAND may also be returned by the first unit 901 to the second unit 902. It should be noted that the method of returning the RAND to the second unit 902 by the first unit 901 reduces the security of this method, for example, it may be attacked by the message reproduction.

The first unit 901 updating the SQN1 according to the SQN2 may be setting the value of SQN1 equal to that of SQN2.

The second unit 902 updating the SQN2 according to the SQN1 may be setting the value of SQN2 equal to that of SQN1, or generating, according to the SQN1, a new value to substitute the value of SQN2; or after the value of SQN2 is configured to be equal to that of the SQN1, generating, according to the SQN2, a new value substituting for the value of SQN2. The step of generating a new value according to the SQN1 or SQN2 may increase a random increment of the SQN1 or SQN2, for example a random number between 1 and 256, to obtain the new value. In practice, the random number between 1 and 256 can be generated from a random number generator.

The first unit 901 verifying whether the SQN2 is acceptable according to the SQN1 stored in the first unit 901 itself can be determining, by the first unit 901, whether the difference between the SQN1 and the SQN2 is within a certain range, for example, whether SQN1 minus SQN2 is larger than 0, or whether SQN1 minus SQN2 is larger than 0 and smaller than 256, etc. If the difference is within the range, determines that the SQN2 is acceptable; otherwise, determines that the SQN2 is unacceptable.

The above calculation of the MAC-A and the MAC-S may be performed by using the known digest algorithm, or performed by using other well-known algorithms for those skilled in the prior art.

After updating the SQN2, the second unit 902 can restart the above authentication procedure, i.e. the second unit 902 generates a RAND, for example, generates the RAND by using a random number generator. The second unit 902 calculates an MAC-A according to the RAND, SQN2 and AK2, sends the RAND, SQN2 and MAC-A to the first unit 901 for corresponding processing, etc.

The first unit 901 and the second unit 902 may agree in advance that: after receiving a resynchronization request from the first unit 901, if the SQNMS is determined to be the agreed value, the second unit 902 performs the one or more agreed operations according to the agreed value.

As agreed, the first unit 901 can send specific information to the second unit 902, so that the second unit 902 can perform the corresponding specific operation according to the specific information.

The first unit 901 and the second unit 902 may also agree in advance that: after receiving a resynchronization request from the first unit 901, if the SQNMS is determined to be the agreed value, the second unit 902 performs the one or more agreed operations according to the agreed value, i.e. performs the one or more agreed operations, which may be one or more such operations as performing key update, performing the authentication arithmetic update, acquiring the corresponding information and returning the result information of performing a specific operation. The acquiring the corresponding information can be acquiring whether the first unit 901 has some abilities, for example, acquiring according to the value of the SQN1 whether the first unit 901 supports the GPS positioning function, whether the first unit 901 supports the mobile payment, etc., the specific operation can be some specific operations performed by the first unit 901, for example, performing the initialization operation according to a configuration, etc.

Figure 4:
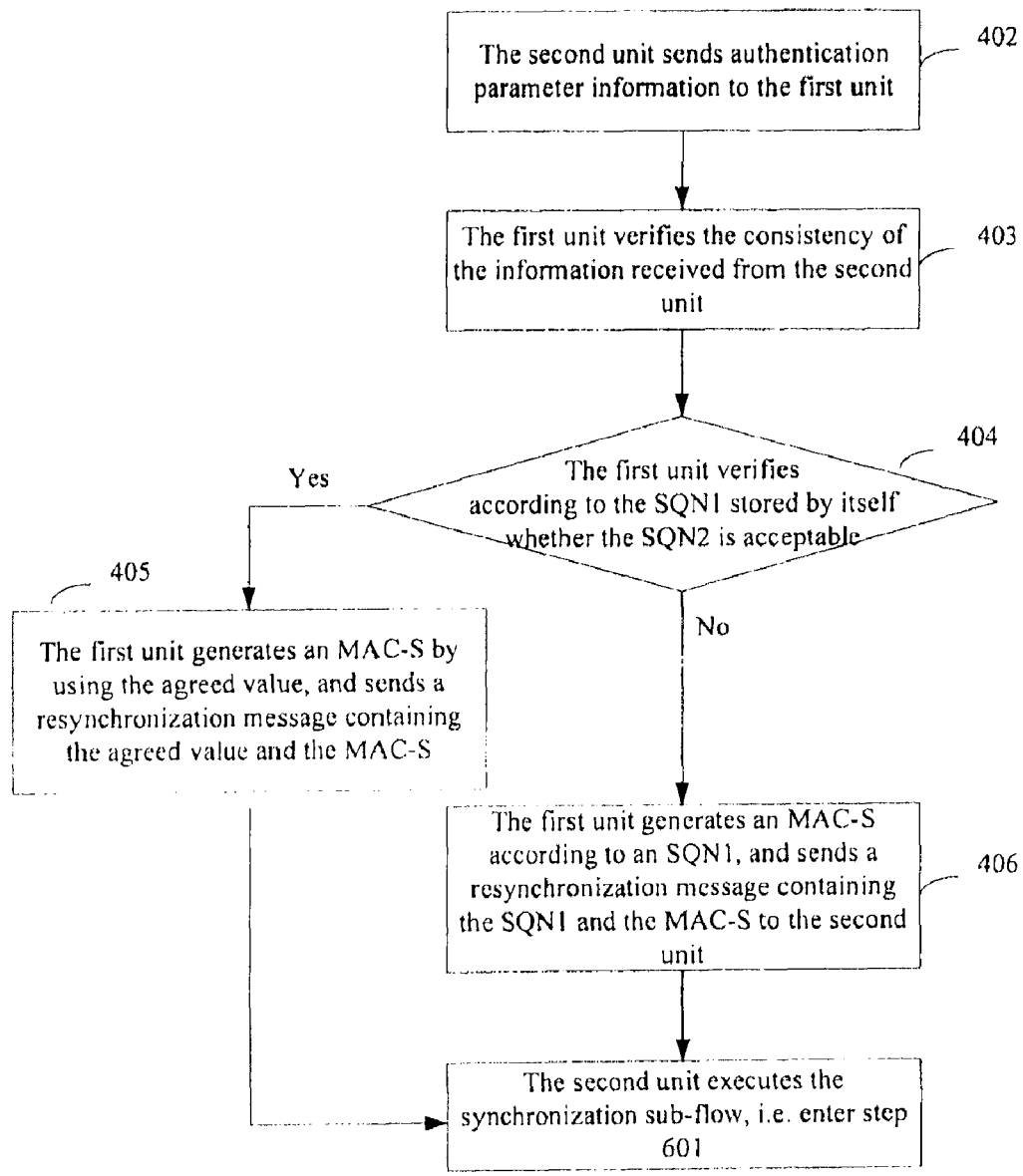
FIG. 4 is a flowchart illustrating the main process, when the first unit needs to send specific information to the second unit, according to the third embodiment of this invention.

FIG. 4 is a flowchart illustrating the main process when the first unit needs to send specific information to the second unit according to the third embodiment of this invention.

Step 402, during authentication, the second unit sends the generated authentication parameter information to the first unit.

The authentication parameter information includes a RAND, an SQN2 and an MAC-A; in practice, while generating the authentication parameters, the second unit generates a RAND first, for example, generates the RAND by using a configured random number generator, then calculates an MAC-A according to the RAND, SQN2 and AK2; and the RAND, SQN2 and MAC-A are token as the authentication parameters to be sent to the first unit.

Step 403, the first unit verifies the consistency of the information received from the second unit, that is, the first unit calculates a result, according to the AK1 and the RAND and SQN2 received from the second unit, using the same method as that used by the second unit for calculating an MAC-A, and compares whether the result calculated by the first unit is consistent with the received MAC-A, if they are not consistent, determines that the authentication of the second unit fails, if the consistency verification succeeds, the process proceeds to step 404.

Step 404, the first unit determines according to the SQN1 stored in itself whether the SQN2 is acceptable, if the SQN2 is acceptable, determines that the authentication of the second unit succeeds, and updates the SQN1 according to the SQN2, then the process proceeds to Step 405; otherwise, if the SQN2 is determined to be unacceptable, the process proceeds to step 406.

Step 405, the first unit calculates an MAC-S according to an agreed value substituting for the SQN1, the SK1 stored in itself as well as the received RAND, and sends a resynchronization message containing the agreed value substituting for the SQN1 and the MAC-S. After receiving the resynchronization message, the second unit enters a sub-process of performing the synchronization procedure.

Step 406, the first unit calculates an MAC-S according to the RAND, SQN1 and SK1, and sends a resynchronization message containing the SQN1 and the MAC-S to the second unit. After receiving the resynchronization message, the second unit enters a sub-process of performing the synchronization procedure.

In the above step 404, the verifying, by the first unit, according to the SQN1 stored in itself whether the SQN2 is acceptable may be determining, by the first unit, whether the difference between the SQN1 and the SQN2 is within a certain range, for example, whether SQN1 minus SQN2 is greater than 0, or whether SQN1 minus SQN2 is greater than 0 but smaller than 256, etc. If the difference is within the range, determining that the SQN2 is acceptable, otherwise determining that the SQN2 is unacceptable.

Figure 5:
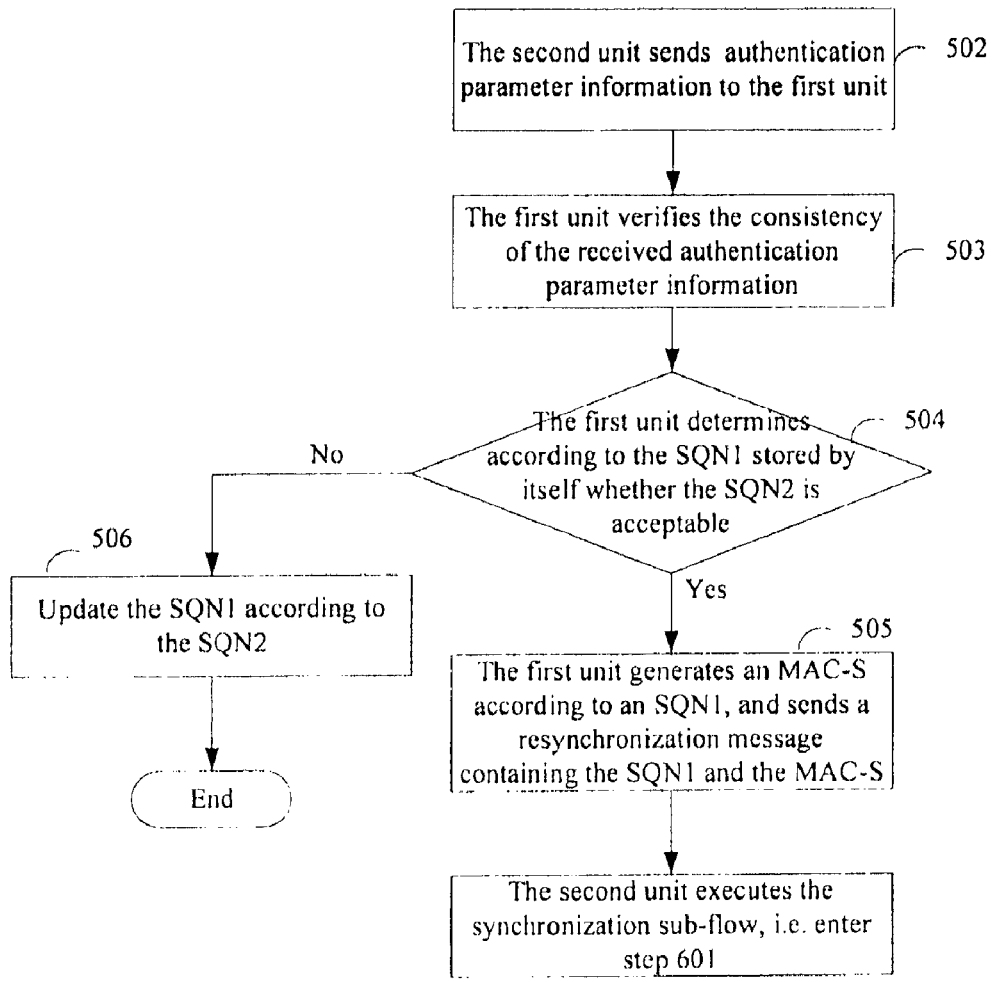
FIG. 5 is a flowchart illustrating the main process, when the first unit need not send specific information to the second unit, according to the third embodiment of this invention.

FIG. 5 is a flowchart illustrating the main process when the first unit need not send specific information to the second unit according to the third embodiment of this invention.

Step 502, during authentication, the second unit sends the generated authentication parameter information to the first unit.

The authentication parameter information includes a RAND, an SQN2 and an MAC-A; in practice, while generating the authentication parameters, the second unit generates the RAND first, for example, generates the RAND by using a random number generator, then calculates an MAC-A according to the RAND, SQN2 and AK2; and takes the RAND, SQN2 and MAC-A as the authentication parameters to be sent to the first unit.

Step 503, the first unit verifies the consistency of the information received from the second unit, that is, the first unit calculates a result according to the AK1 and the RAND and SQN2 received from the second unit using the same method as that used by the second unit for calculating an MAC-A, and compares whether the result calculated by the first unit itself is consistent with the received MAC-A, if they are not consistent, determines that the authentication of the second unit fails. If the consistency verification succeeds, the process proceeds to step 504.

Step 504, the first unit verifies according to the SQN1 stored in itself whether the SQN2 is acceptable, if the SQN2 is acceptable, determines that the authentication of the second unit succeeds, and then the process proceeds to step 506, in which the SQN1 is updated according to the SQN2, and then the process terminates; otherwise, if the SQN2 is determined to be unacceptable, the process proceeds to step 505.

Step 505, the first unit calculates an MAC-S according to the RAND, SQN1 and SK1, and sends a resynchronization message containing the SQN1 and the MAC-S to the second unit. After receiving the resynchronization message, the second unit enters a sub-process of performing the synchronization procedure.

In the above step 504, the verifying, by the first unit, according to the SQN1 stored in itself whether the SQN2 is acceptable can be determining, by the first unit, whether the difference between the SQN1 and the SQN2 is within a certain range, for example, whether SQN1 minus SQN2 is greater than 0, or whether SQN1 minus SQN2 is greater than 0 but smaller than 256, etc. If the difference is within the range, determining that the SQN2 is acceptable, otherwise determining that the SQN2 is unacceptable.

Figure 6:
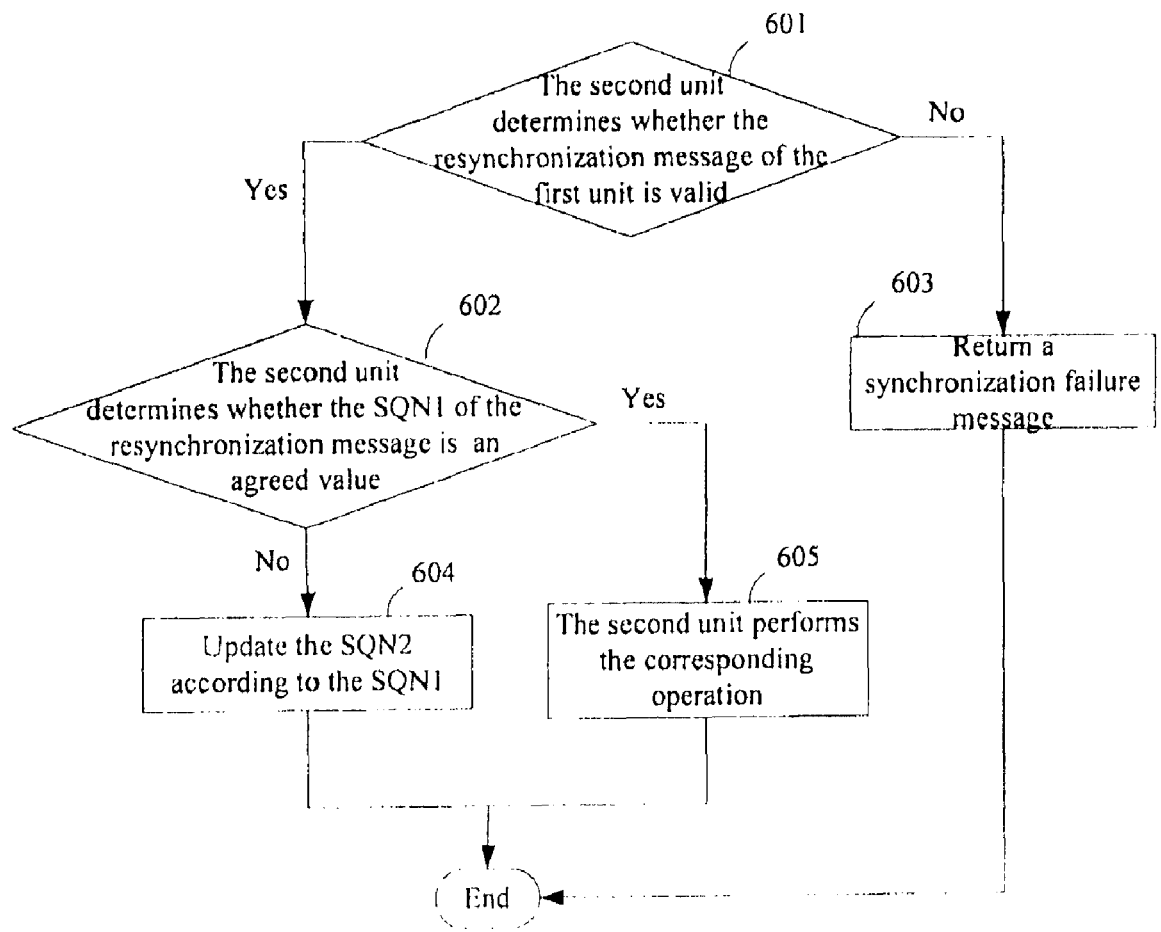
FIG. 6 is a flowchart illustrating the sub-process for performing the synchronization processing by the second unit according to the third embodiment of this invention.

Refer to FIG. 6, which is a flowchart illustrating a sub-process for performing the synchronization procedure by the second unit in the third embodiment of this invention:

Step 601, the second unit determines the validity of the resynchronization message of the first unit, if the resynchronization message of the first unit is valid, the process proceeds to step 602; if the resynchronization message of the first unit is not valid, the process proceeds to step 603, in which a synchronization failure message is returned, and the process terminates.

Step 602, the second unit determines whether the SQN1 of the resynchronization message is the agreed value, if the SQN1 is not the agreed value, the process proceeds to step 604; if the SQN1 is the agreed value, the process proceeds to step 605.

Step 604, the SQN2 is updated according to the SQN1, and the process terminates.

Step 605, the second unit performs one or more agreed operations. In practice, the first unit and the second unit agree in advance that: after receiving a resynchronization request from the first unit, if the SQNMS is determined to be the agreed value, the second unit performs one or more operations according to agreed content, that is, performs the one or more operations corresponding to the agreed value. Then the process terminates.

Figure 7:
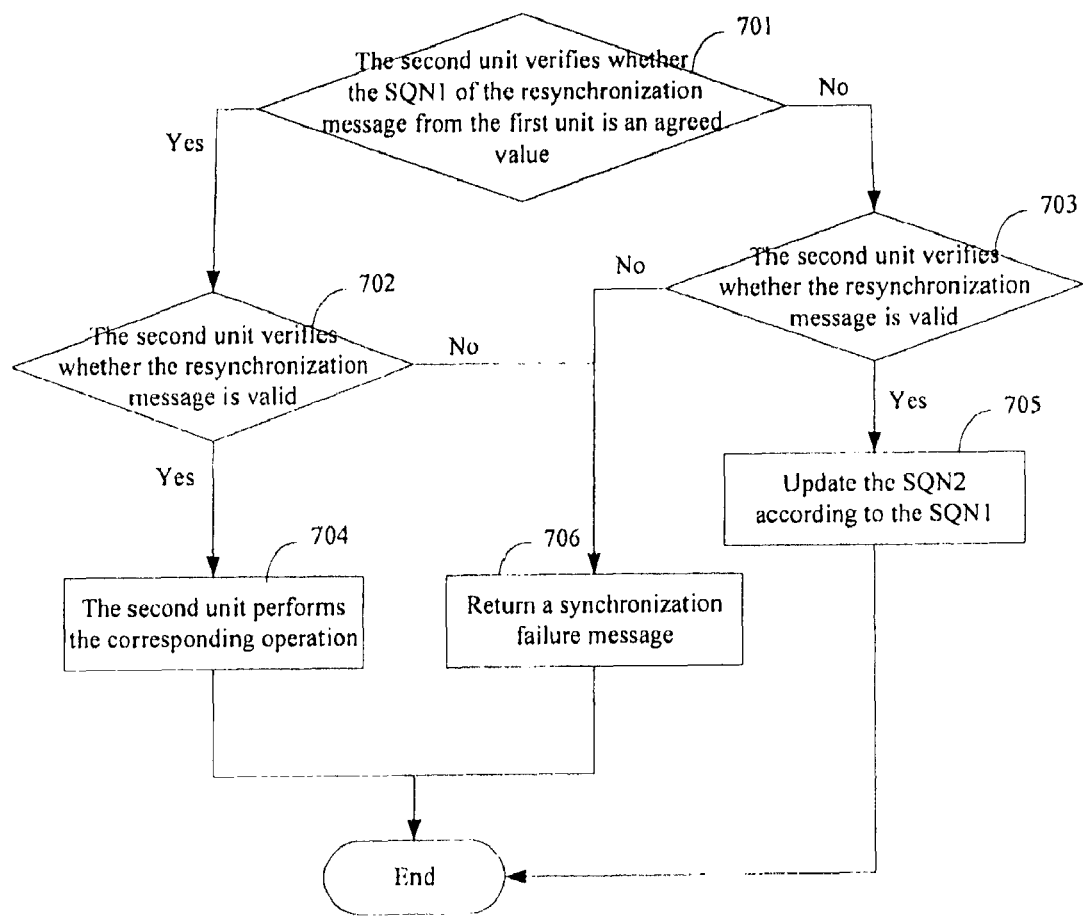
FIG. 7 is a flowchart illustrating the sub-process for performing the synchronization processing by the second unit according to the fourth embodiment of this invention.
Figure 8:
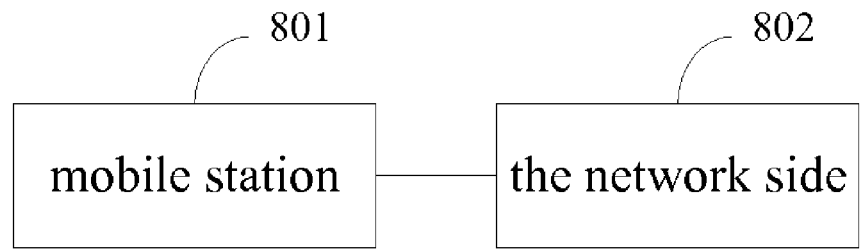
FIG. 8 is a structural schematic view of a first mobile communication system.
Figure 9:
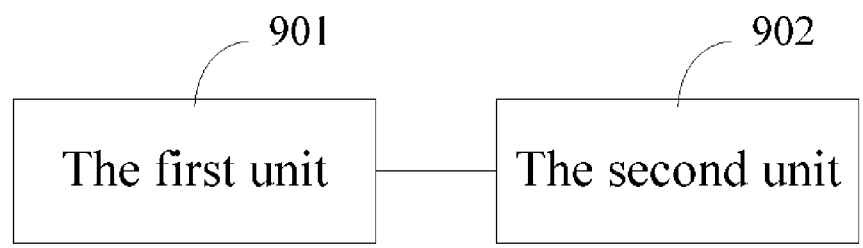
FIG. 9 is a structural schematic view of a second mobile communication system.

Referring to FIGS. 4, 5 and 7, the fourth embodiment is described hereinafter. In the third embodiment, while performing the sub-process of synchronization procedure, the second unit of the third embodiment determining the validity of the resynchronization message first and determining whether the SQN1 of the resynchronization message is the agreed value later. In this embodiment, however, the second unit determines whether the SQN1 of the resynchronization message is the agreed value first and determines the validity of the resynchronization message later as shown in FIG. 7:

Step 701, the second unit verifies whether the SQN1 of the resynchronization message is the agreed value, if the SQN1 is the agreed value, the process proceeds to step 702; if the SQN1 is not the agreed value, the process proceeds to step 703.

Step 702, the second unit determines the validity of the resynchronization message of the first unit, if the resynchronization message of the first unit is valid, the process proceeds to step 704, otherwise, if the resynchronization message of the first unit is not valid, the process proceeds to step 706.

Step 703, the second unit determines the validity of the resynchronization message of the first unit, if the resynchronization message of the first unit is valid, the process proceeds to step 705, otherwise, if the resynchronization message of the first unit is not valid, the process proceeds to step 706.

Step 704, the second unit performs one or more agreed operations. In practice, a unit A and a unit B agree in advance that: after receiving a resynchronization request from the unit A, if the SQN1 is determined to be the agreed value, the unit B performs one or more agreed operations according to agreed contents, i.e. performs the one or more agreed operations according to the agreed values. Then the process terminates.

Step 705, the SQN2 is updated according to the SQN1, and then the process terminates.

Step 706, a synchronization failure message is returned, and then the process terminates.

In the above embodiments, when the second unit performs the sub-process of synchronization procedure, the step of determining the validity of the resynchronization message of the first unit by the second unit includes: the second unit calculates a result according to the SK2 and the RAND stored in the second unit itself and the SQN1 received from the first unit using the same method as that used by the first unit for calculating an MAC-S, and compares the result calculated by the second unit itself with the MAC-S received from the first unit and determines whether they are consistent, if they are consistent, determines that the MAC-S is valid, that is, determines that the resynchronization message of the first unit is valid; otherwise determines that the MAC-S is not valid, that is, determines that the resynchronization message of the first unit is not valid. Herein, when the second unit verifies the consistency of the MAC-S, a RAND is needed, and the RAND may be stored in the second unit correspondingly after the authentication parameters are generated, or may be returned by the first unit. It should be noted that the method of returning the RAND to the second unit by the first unit reduces the security of this method, for example, it may be attacked by the message reproduction.

In the foregoing embodiments, the determining of whether the SQN1 is the agreed value and the determining of the validity of the AUTS are described; the order of the two determining steps can be exchanged. Generally, the exchange of order does not influence the implementation effects. It should be noted that, in the fourth embodiment, that is, in the case of determining whether the SQN1 is the agreed value first, and determining the validity of the resynchronization message later, the second unit, after determining that the SQN1 is the agreed value, can further determine according to the agreed value of the SQN1 the determining processing mode used for determining the validity of the resynchronization message, for example, the second unit determines which algorithm or parameters can be used for performing the determination of the validity of the resynchronization message according to the agreed value, etc. Therefore, the case of determining whether the SQN1 is the agreed value first and determining the validity of the resynchronization message later can make this method more expansible.

In the above embodiments, the first unit can calculate the MAC-S without a RAND. Correspondingly, the second unit can also determine the validity of the resynchronization of the first unit without a RAND. Such operation will reduce the security of the first synchronization key, however, it is a change-inferior implementation, and the implementation step of this change-inferior method will not be further described herein.

In the above embodiments, the AK1 and SK1 of the first unit can be the same, that is, the AK1 and SK1 can be a same key; correspondingly, in the second unit, the AK2 and SK2 can also be the same, that is, the AK2 and SK2 can also be a same key.

In the third and fourth embodiments, some values of the SQN1 can be used as the agreed values, for example, values of SQN1 less than 256 can be used as the agreed values, certainly, the initialization value that used for determining whether the SQN2 is within an acceptable range by the SQN1 should be equal to or greater than 256. Certainly, one specific value, such as 1024, can also be configured to be the agreed value. The values within a range and some specific values of SQN1 also can be used as the agreed values, for example, the values of the SQN1 less than 256 and two specific values, 1024 and 2048, can be used as the agreed values at the same time. For example, SQNMS=128 is agreed to represent the information of updating the KI transmitted to the second unit, and SQNMS=1023 is agreed to represent the information of the key update success transmitted to the second unit, and SQNMS=1024 is agreed to represent the information of the key update failure transmitted to the second unit.

It should be appreciated that the foregoing is only preferred embodiments of the invention and is not for use in limiting the invention. Any modification, equivalent substitution, and improvement without departing from the spirit and principle of this invention should be covered in the protection scope of the invention.

What is claimed is:

1. A method for transmitting information, comprising:
generating, by the mobile station (MS), an authentication resynchronization token (AUTS) by using an agreed value substituting for a sequence number in MS (SQNMS);
sending, by the MS, a resynchronization request containing the AUTS to a network;
upon receiving the resynchronization request, performing, by the network, one or more agreed operations corresponding to the agreed value if determining that the SQNMS of the AUTS is the agreed value.

2. The method of claim 1, further comprising:
before generating the AUTS, sending, by the MS, a message for triggering an authentication procedure to the network,
upon receiving the message, sending, by the network, an authentication request containing authentication parameters to the MS;
authenticating the network, by the MS, according to the authentication parameters before sending the resynchronization request to the network.

3. The method of claim 2, wherein the message for triggering an authentication procedure comprises one of: a location update request and a service request.

4. The method of claim 2, wherein the authentication parameters comprise a random number (RAND) and an authentication token (AUTN);
said authenticating the network by the MS comprises authenticating the network according to the RAND and the AUTN.

5. The method of claim 4, wherein said authenticating the network according to the RAND and the AUTN comprises:
determining whether the AUTN meets requirement of consistency, if the AUTN does not meet the requirement of consistency, determining that the authentication of the network fails.

6. The method of claim 5, further comprising:
after determining that the AUTN meets the requirement of consistency, determining whether a sequence number in Home Environment (SQNHE) is within an acceptable range, if the SQNHE is within the acceptable range, determining that the authentication of the network succeeds, and generating the AUTS by using the agreed value substituting for the SQNMS, otherwise, generating the AUTS by using the SQNMS.

7. The method of claim 1, further comprising:
after receiving the resynchronization request, determining, by the network, whether the AUTS is valid, if the AUTS is valid and the SQNMS is the agreed value, performing the one or more agreed operations.

8. The method of claim 7, further comprising:
after determining that the SQNMS is the agreed value, determining whether the AUTS is valid, if the AUTS is valid, performing the one or more agreed operations.

9. The method of claim 7, further comprising:
after determining that the AUTS is valid, determining whether the SQNMS is the agreed value;
if the SQNMS is the agreed value, performing the one or more agreed operations;
if the SQNMS is not the agreed value, updating the SQNHE according to the SQNMS.

10. The method of claim 1, wherein the agreed value comprises at least: values within an agreed range, or one or more specific values.

11. The method of claim 1, wherein the performing one or more agreed operations corresponding to the agreed value comprises performing at least one of:
key updating, authentication algorithm updating, theft protection verification, canceling theft protection verification, acquiring corresponding information and returning result information of performing a specific operation.

12. An authentication method, applied in communication network for authentication between a mobile station (MS) and a network, comprising:
generating, by the network, a random number, generating an authentication vector according to the random number, an authentication key corresponding to the MS and a sequence number, and sending the authentication vector to the MS;
verifying, by the MS, the consistency of the authentication vector according to an authentication key stored in the MS, and determining according to a sequence number in MS whether the sequence number from the network is acceptable, if the consistency verification of the authentication vector succeeds and the sequence number from the network is acceptable, determining that the authentication of the network succeeds, generating a resynchronization token by using an agreed value substituting for the sequence number in MS, and sending to the network a resynchronization request containing the resynchronization token;

upon receiving the resynchronization request, performing, by the network, one or more agreed operations if determining that the sequence number of the resynchronization token is the agreed value.

13. The authentication method of claim 12, further comprising:
before generating by the network a random number, sending, by the MS, to the network a message for triggering an authentication procedure; wherein the message for triggering the authentication procedure is one of: a location update request and a service request.

14. The authentication method of claim 12, further comprising:
if the consistency verification of the authentication vector succeeds but the sequence number from the network is unacceptable, generating, by the MS, a resynchronization token according to the sequence number stored in the MS, and sending a resynchronization request containing the resynchronization token to the network.

15. The authentication method of claim 12, further comprising:
if the consistency verification of the authentication vector succeeds and the sequence number from the network is acceptable, updating, by the MS, the sequence number stored in the MS according to the sequence number from the network.

16. The authentication method of claim 12, further comprising:
after receiving the resynchronization request, determining, by the network, whether the resynchronization token is valid, if the AUTS is valid and the SQNMS is the agreed value, performing the one or more agreed operations.

17. The authentication method of claim 16, further comprising:
after determining that the sequence number from the MS is the agreed value, determining whether the resynchronization token is valid, and if the resynchronization token is valid, performing the one or more agreed operations.

18. The authentication method of claim 16, further comprising:
after determining that the resynchronization token is valid, determining whether the sequence number from the MS is the agreed value;
if the sequence number from the MS is the agreed value, performing the one or more agreed operations;
if the sequence number from the MS is not the agreed value, updating the sequence number stored on the network according to the sequence number from the MS.

19. The authentication method of claim 12, wherein the agreed value comprises at least: values within an agreed range, or one or more specific values.

20. The authentication method of claim 12, wherein said performing the one or more agreed operations comprises performing at least one of:
key updating, authentication algorithm updating, theft protection verification, canceling theft protection verification, acquiring corresponding information and returning result information of performing a specific operation.

21. An authentication method, applied for authentication between a first unit and a second unit which communicate with each other;
wherein the first unit stores a first authentication key, a first synchronization key and a first sequence number;

the second unit stores a second authentication key, a second synchronization key and a second sequence number;
the method comprising:
generating, by the second unit, a random number, generating a message authentication code according to the random number, the second authentication key and the second sequence number, and sending the random number, the second sequence number and the message authentication code to the first unit;
verifying, by the first unit, the consistency of the message authentication code according to the first authentication key, the random number and the second sequence number, and determining according to the first sequence number whether the second sequence number is acceptable; if the consistency verification of the message authentication code succeeds and the second sequence number is acceptable, determining that the authentication of the second unit succeeds, generating a resynchronization authentication code by using an agreed value substituting for the first sequence number, and the first synchronization key, sending to the second unit a resynchronization request containing the resynchronization authentication code and the agreed value;
upon receiving the resynchronization request, performing, by the second unit, one or more agreed operations if determining that the first sequence number in the resynchronization authentication code is the agreed value.

22. The authentication method of claim 21, wherein said generating a resynchronization authentication code by using the agreed value and the first synchronization key comprises:
generating a resynchronization authentication code by using the agreed value, the random number and the first synchronization key.

23. The authentication method of claim 22, further comprising:
if the consistency verification of the message authentication code succeeds and the second sequence number is acceptable, updating, by the first unit, the first sequence number according to the second sequence number.

24. The authentication method of claim 22, further comprising:
if the consistency verification of the message authentication code succeeds but the second sequence number is unacceptable, generating, by the first unit, a resynchronization authentication code according to the first sequence number, the random number and the first synchronization key, and sending to the network a resynchronization request containing the resynchronization authentication code and the first sequence number.

25. The authentication method of claim 22, wherein said verifying by the first unit the consistency of the message authentication code comprises:
generating, by the first unit, a result according to the random number, the first authentication key and the second sequence number by using the same method as generating by the second unit the message authentication code according to the random number, the second authentication key and the second sequence number; comparing whether the generating result is consistent with the message authentication code, if they are consistent, determining that the consistency verification of the message authentication code succeeds, otherwise, determining that the consistency verification of the message authentication code fails.

26. The authentication method of claim 22, wherein said determining by the first unit whether the second sequence number is acceptable comprises:

determining whether the difference between the second sequence number and the first sequence number is within a range, if the difference is within the range, determining that the second sequence number is acceptable, otherwise, determining that the second sequence number is unacceptable.

27. The authentication method of claim 22, further comprising:

after receiving the resynchronization request, determining, by the second unit, whether the resynchronization authentication code is valid, if the AUTS is valid and the SQNMS is the agreed value, performing the one or more agreed operations.

28. The authentication method of claim 27, further comprising:

after determining that the first sequence number is the agreed value, determining whether the resynchronization authentication code is valid, and if the resynchronization authentication code is valid, performing the one or more agreed operations.

29. The authentication method of claim 27, further comprising:

after determining that the resynchronization authentication code is valid, determining whether the first sequence number is the agreed value;

if the first sequence number is the agreed value, performing the one or more agreed operations;

if the first sequence number is not the agreed value, updating the second sequence number according to the first sequence number.

30. The authentication method of claim 27, wherein said determining by the second unit whether the resynchronization authentication code is valid comprises:

generating, by the second unit, a result according to the second synchronization key, the random number and the first sequence number by using the same method of generating by the first unit a resynchronization authentication code according to the random number, the first synchronization key and the first sequence number, comparing whether the calculated result is consistent with the resynchronization authentication code, if they are consistent, determining that the resynchronization authentication code is valid, otherwise, determining that the resynchronization authentication code is not valid.

31. The authentication method of claim 21, wherein the agreed value comprises at least: values within an agreed range, or one or more specific values.

32. The authentication method of claim 21, wherein said performing the one or more agreed operations comprises performing at least one of:

key updating, authentication algorithm updating, acquiring corresponding information and returning result information of performing a special operation.

* * * * *